United States Patent
Wong et al.

(10) Patent No.: US 8,589,952 B2
(45) Date of Patent: Nov. 19, 2013

(54) DUAL OPERATING SYSTEM OPERATION AND CONFIGURATION

(75) Inventors: Yoon Kean Wong, Redwood City, CA (US); Kevin Morishige, Los Altos Hills, CA (US); Matthew W. Crowley, Los Altos, CA (US)

(73) Assignee: Palm, Inc., Sunnyvale, CA (US)

( * ) Notice: Subject to any disclaimer, the term of this patent is extended or adjusted under 35 U.S.C. 154(b) by 356 days.

(21) Appl. No.: 12/827,110

(22) Filed: Jun. 30, 2010

(65) Prior Publication Data

US 2012/0005691 A1    Jan. 5, 2012

(51) Int. Cl.
*G06F 9/04*    (2006.01)

(52) U.S. Cl.
USPC ............................... 719/319; 719/324; 718/1

(58) Field of Classification Search
None
See application file for complete search history.

(56) References Cited

U.S. PATENT DOCUMENTS

| 2009/0172781 A1* | 7/2009 | Masuoka et al. .................. 726/3 |
| 2010/0060572 A1* | 3/2010 | Tsern ............................ 345/157 |
| 2010/0333088 A1* | 12/2010 | Rogel et al. ....................... 718/1 |

OTHER PUBLICATIONS

Gernot Heiser, Virtualization for embedded systems, Nov. 27, 2007, pp. 1-28.*
Lamia Youseff et al., Inter-OS communication on highly parallel multi-core architecture, Oct. 17, 2008, pp. 1-10.*
"The Mobile Virtualization Solution," Open Kernel Labs™, 2009, 17 pages.

* cited by examiner

*Primary Examiner* — H S Sough
*Assistant Examiner* — Syed Roni

(57) ABSTRACT

A system and a method are disclosed for device having a first and a second operating system communicatively coupled with each other. The first operating system is configured to manage a state of the mobile computing device, resources operable with the mobile computing device, and data management for the mobile computing device. The second operating system is a desktop-type operating system. In one embodiment, in response to coupling a docking station, the mobile computing device is configured to provide the second operating system access to peripherals. In addition, another embodiment the first operating system is configured to include an interface to access and execute applications executable through the second operating system.

20 Claims, 13 Drawing Sheets

DUAL OPERATING SYSTEM OPERATION AND CONFIGURATION

BACKGROUND

1. Field of Art

The disclosure generally relates to the field of operating systems in mobile computing devices.

2. Description of Art

Mobile computing systems with telephonic functionality, e.g., smartphones, are rapidly growing in popularity. The install base of such systems is about to, or already did, exceed the install based of personal computers. However, devices such as smartphones have limitations that continue to make personal computers a platform of choice. For example, smartphones typically lack drivers to interoperate with popular peripherals such as external keyboards, pointing devices (e.g., mouse or trackpad), printers and scanners. To address this deficiency some smartphones are configured to interoperate with specially configured peripherals that leverage a BLUETOOTH protocol. However, these solutions may require specialized drivers particular to the smartphone and/or specialized peripherals having BLUETOOTH capabilities. Other attempts to address these deficiencies require a special application, for example, a print application that "prints" to a network cloud. The network cloud is configured to operate with a specific printer. Each of these solutions is cumbersome and may require a high level of customization that makes them very inefficient.

Further, smartphones are not structured to support and execute complex personal computer software, for example, ADOBE PHOTOSHOP or AUTOCAD. To address this deficiency, some solutions provide a "run-time" version that is used merely to open and view files created on the full personal computer software. Other attempts to address this deficiency have focused on development of a highly "slimmed down" or "lite" version of these applications. These versions, of course, lack the full functionality of the full personal computer software.

Still other shortcomings of smartphones relative to the personal computer exist such as display form factor and power draw. Moreover, even relatively simple interactions between the smartphone and personal computer are not without problems, often required installation of special software and synchronization for data management.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
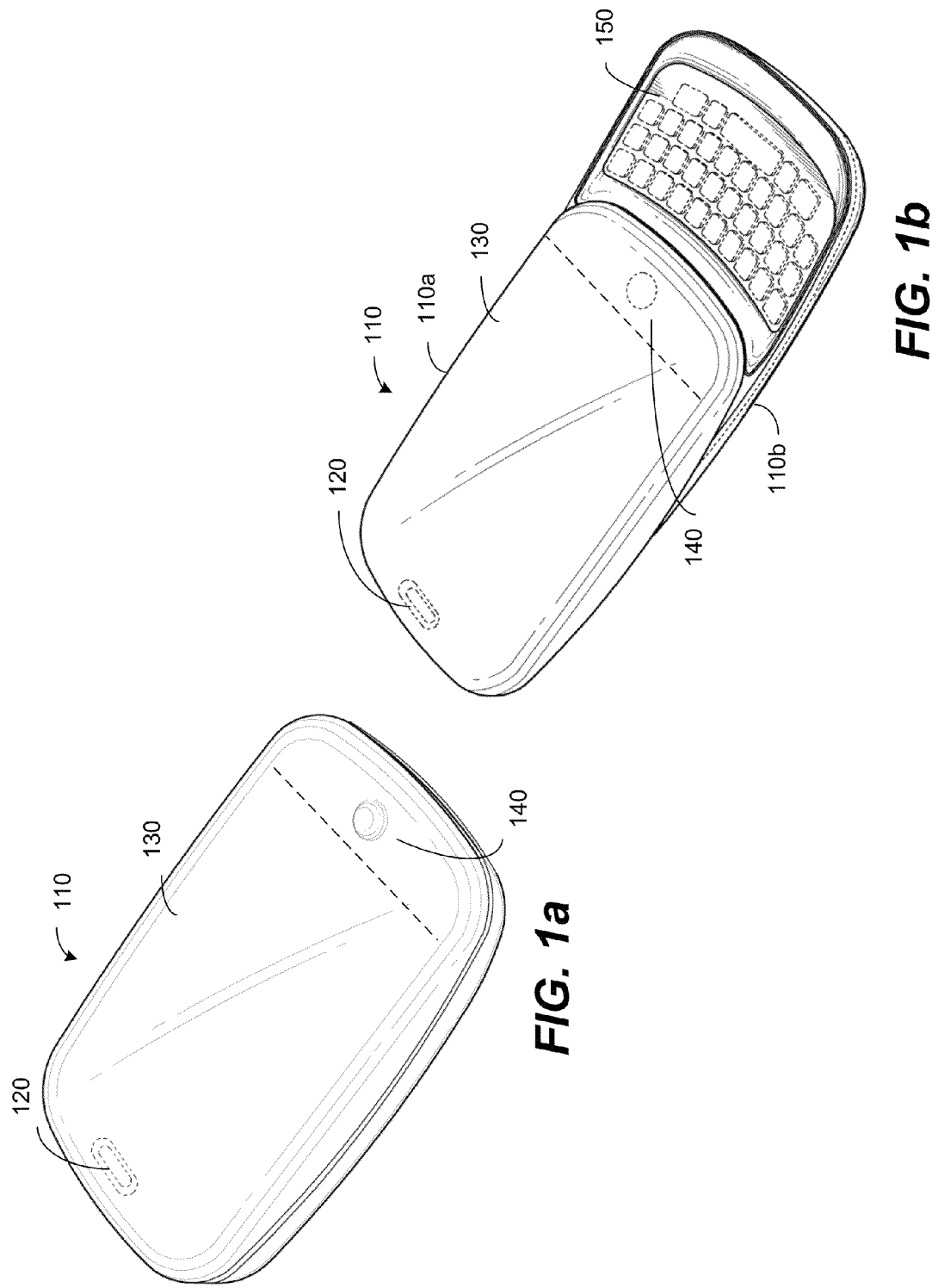
FIG. 1a illustrates one embodiment of a mobile computing device in a first positional state.
FIG. 1b illustrates one embodiment of the mobile computing device in a second positional state.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system (and method and computer readable storage medium) includes operating a mobile computing device with at least two operating systems. In one embodiment a first operating system is a host (or primary or native) operating system for the mobile computing device and the second operating system is a desktop-type operating system. The first operating system is configured to manage a state of the mobile computing device, resources operable with the mobile computing device, and data management for the mobile computing device. The second operating system is configured similar to a conventional desktop (or laptop, desktop or notebook computer) operating system.

By way of example, in one embodiment the system is configured to initialize a virtual machine layer. The virtual machine is configured to manage communications between a first operating system and a second operating system. The system initiates a first operating system, the first operating system interfacing with the virtual machine and configured to manage a state of the mobile computing device, resources operable with the mobile computing device, and data management for the mobile computing device. The system receives an indication of communicatively coupling a docking station and initiates a second operating system in response to receiving the indication. The second operating system interfaces with the virtual machine. A plurality of device drivers is initiated and each device driver comprises program code for interfacing with a peripheral device. The second operating system is now configured to communicate with the peripherals. Hence, the disclosed configuration provides, inter alia, for simultaneous operation and interaction with two operating systems within a mobile computing device and for access to peripheral devices through the second operating system.

It is noted that the virtual machine may be initiated after the first operating system is initiated and may be initiated through the first operating system. In addition, it is noted that the second operating system may be configured to be immediately initiated (at device start up) or may be initiated in response to some activity initiated by the device, for example, through the operating system or the virtual machine.

In an alternate aspect, a system (and method and computer readable storage medium) is configured for communicating between the first operating system and the second operating system that are simultaneously operable on the mobile computing device. The system initiates the first operating system and the second operating system. Within the second operating system is an application program executable only through the second operating system. By way of example, in one embodiment the system initializes the virtual machine to manage communications between the first operating system and the second operating system.

In an example embodiment, the system is configured to provide an interface through the first operating system for interaction with the application program within the second operating system. The second operating system receives a message that has the commands/instructions for the application program passed from the first operating system and executes the application. Hence, the disclosed configuration increases, inter alia, the number of available application programs executable through a mobile computing device as is further described herein.

Example Mobile Computing Device

In one example embodiment, the configuration as disclosed may be configured for use between a mobile computing device, that may be host device, and an accessory device. FIGS. 1a and 1b illustrate one embodiment of a mobile computing device 110. FIG. 1a illustrates one embodiment of a first positional state of the mobile computing device 110 having telephonic functionality, e.g., a mobile phone or smartphone. FIG. 1b illustrates one embodiment of a second positional state of the mobile computing device 110 having telephonic functionality, e.g., a mobile phone, smartphone, netbook, or tablet computer. The mobile computing device 110 is configured to host and execute a phone application for placing and receiving telephone calls.

It is noted that for ease of understanding the principles disclosed herein are in an example context of a mobile computing device 110 with telephonic functionality operating in a mobile telecommunications network. However, the principles disclosed herein may be applied in other duplex (or multiplex) telephonic contexts such as devices with telephonic functionality configured to directly interface with public switched telephone networks (PSTN) and/or data networks having voice over internet protocol (VoIP) functionality. Likewise, the mobile computing device 110 is only by way of example, and the principles of its functionality apply to other similar computing devices.

The mobile computing device 110 includes a first portion 110a and a second portion 110b. The first portion 110a comprises a screen for display of information (or data) and may include navigational mechanisms. These aspects of the first portion 110a are further described below. The second portion 110b comprises a keyboard and also is further described below. The first positional state of the mobile computing device 110 may be referred to as an "open" position, in which the first portion 110a of the mobile computing device slides in a first direction exposing the second portion 110b of the mobile computing device 110 (or vice versa in terms of movement). The mobile computing device 110 remains operational in either the first positional state or the second positional state.

In one embodiment, the mobile computing device 110 is configured to be of a form factor that is convenient to hold in a user's hand, for example, a personal digital assistant (PDA) or a smartphone form factor. For example, the mobile computing device 110 can have dimensions ranging from 7.5 to 15.5 centimeters in length, 5 to 15 centimeters in width, 0.5 to 2.5 centimeters in thickness and weigh between 50 and 250 grams. In alternate embodiments, the mobile computing device 110 may be larger, for example, having the form factor of an electronic computer tablet or pad or an electronic book reader.

The mobile computing device 110 includes a speaker 120, a screen 130, and an optional navigation area 140 as shown in the first positional state. The mobile computing device 110 also includes a keypad 150, which is exposed in the second positional state. The mobile computing device also includes a microphone (not shown) and headset jack (not shown). The mobile computing device 110 also may include one or more switches (not shown). The one or more switches may be buttons, sliders, or rocker switches and can be mechanical or solid state (e.g., touch sensitive solid state switch).

The screen 130 of the mobile computing device 110 is, for example, a 240×240, a 320×320, a 320×480, or a 640×480 touch sensitive (including gestures) display screen. The screen 130 can be structured from, for example, such as glass, plastic, thin-film or composite material. The touch sensitive screen may be a transflective liquid crystal display (LCD) screen. In alternative embodiments, the aspect ratios and resolution may be different without departing from the principles of the inventive features disclosed within the description. By way of example, embodiments of the screen 130 comprises an active matrix liquid crystal display (AMLCD), a thin-film transistor liquid crystal display (TFT-LCD), an organic light emitting diode (OLED), an interferometric modulator display (IMOD), a liquid crystal display (LCD), or other suitable display device. In an embodiment, the display displays color images. In another embodiment, the screen 130 further comprises a touch-sensitive display (e.g., pressure-sensitive (resistive), electrically sensitive (capacitive), acoustically sensitive (SAW or surface acoustic wave), photo-sensitive (infra-red)) including a digitizer for receiving input data, commands or information from a user. The user may use a stylus, a finger or another suitable input device for data entry, such as selecting from a menu or entering text data.

The optional navigation area 140 is configured to control functions of an application executing in the mobile computing device 110 and visible through the screen 130. For example, the navigation area includes an x-way (x is a numerical integer, e.g., 5) navigation ring that provides cursor control, selection, and similar functionality. In addition, the navigation area may include selection buttons to select functions displayed through a user interface on the screen 130. In addition, the navigation area also may include dedicated function buttons for functions such as, for example, a calendar, a web browser, an e-mail client or a home screen. In this example, the navigation ring may be implemented through mechanical, solid state switches, dials, or a combination thereof. In an alternate embodiment, the navigation area 140 may be configured as a dedicated gesture area, which allows for gesture interaction and control of functions and operations shown through a user interface displayed on the screen 130.

The keypad area 150 may be a numeric keypad (e.g., a dialpad) or a numeric keypad integrated with an alpha or alphanumeric keypad or character keypad 150 (e.g., a keyboard with consecutive keys of Q-W-E-R-T-Y, A-Z-E-R-T-Y, or other equivalent set of keys on a keyboard such as a DVORAK keyboard or a double-byte character keyboard).

Although not illustrated, it is noted that the mobile computing device 110 also may include an expansion slot. The expansion slot is configured to receive and support expansion cards (or media cards). Examples of memory or media card form factors include COMPACTFLASH, SD CARD, XD CARD, MEMORY STICK, MULTIMEDIA CARD, SDIO, and the like.

Example Mobile Computing Device Architectural Overview

Figure 2:
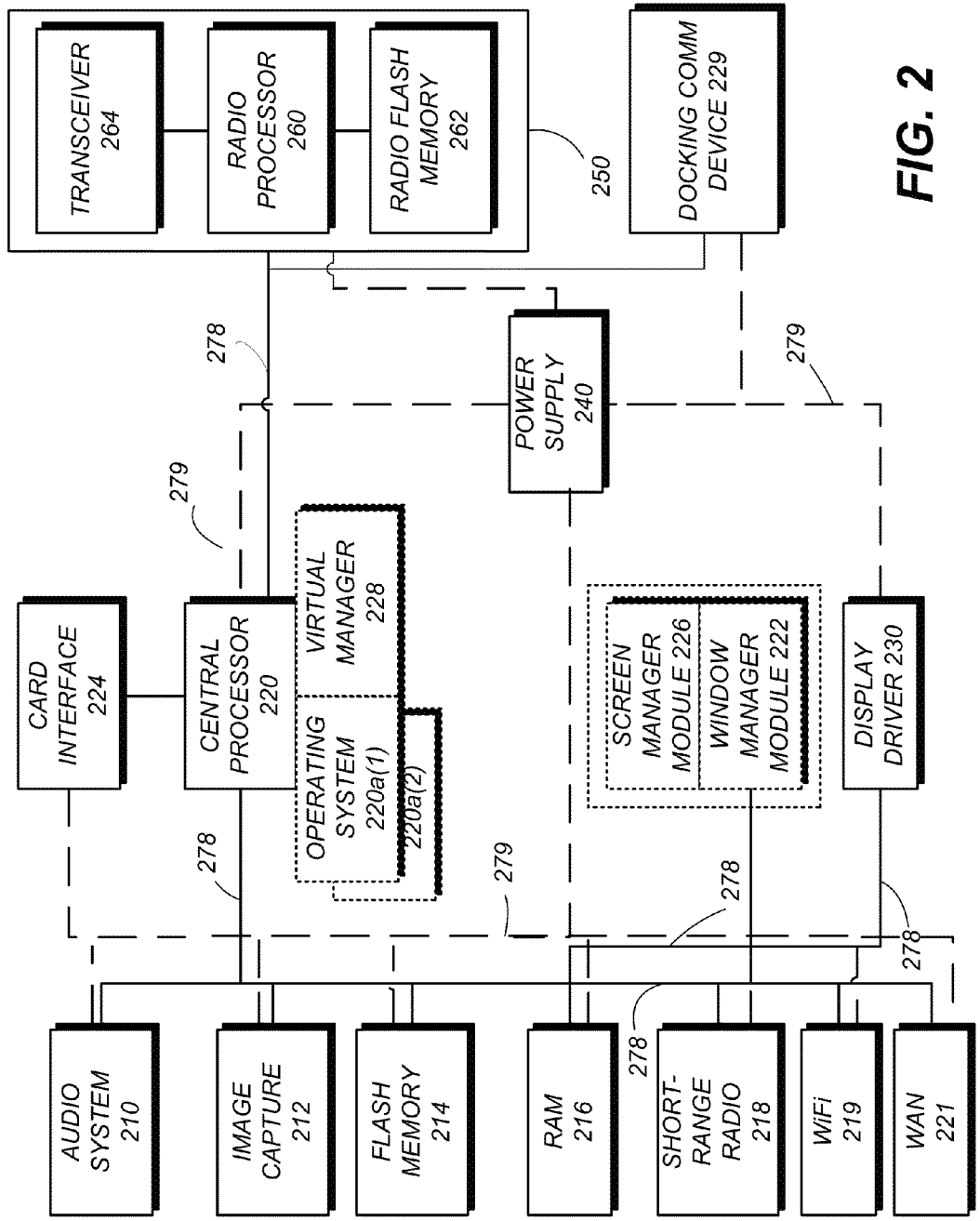
FIG. 2 illustrates one embodiment of an architecture of a mobile computing device.

Referring next to FIG. 2, a block diagram illustrates one embodiment of an architecture of a mobile computing device 110, with telephonic functionality. By way of example, the architecture illustrated in FIG. 2 will be described with respect to the mobile computing device of FIGS. 1a and 1b. The mobile computing device 110 includes a central processor 220, a power supply 240, and a radio subsystem 250. Examples of a central processor 220 include processing chips and system based on architectures such as ARM (including cores made by microprocessor manufacturers), ARM XSCALE, AMD ATHLON, SEMPRON or PHENOM, INTEL ATOM, XSCALE, CELERON, CORE, PENTIUM or ITANIUM, IBM CELL, POWER ARCHITECTURE, SUN SPARC and the like.

The central processor 220 is configured for operation with a computer operating system. The operating system is an interface between hardware and an application, with which a user typically interfaces. The operating system is responsible for the management and coordination of activities and the sharing of resources of the mobile computing device 110. The operating system provides a host environment for applications that are run on the mobile computing device 110. As a host, one of the purposes of an operating system is to handle the details of the operation of the mobile computing device 110.

In the configuration as disclosed the mobile computing device 110 is configured to execute with a first operating system 220a(1) and a second operating system 220a(2). The first operating system 220a(1) may be referred to as the host (or primary or native operating system). In one embodiment, the first operating system 220a(1) is configured to manage a state of the mobile computing device, resources operable with the mobile computing device 110, and data management for the mobile computing device 110. Examples of the first operating system 220a(1) include PALM WEBOS, RIM BLACKBERRY OS, MICROSOFT WINDOWS 7 MOBILE, NOKIA SYMBIAN OS, GOOGLE ANDROID OS, or APPLE iPHONE OS.

The second operating system 220a(2) is an extension (or extended) desktop-type operating system. The desktop-type operating system corresponds to a conventional operating system executing on most desktop, laptop, notebook, or tablet personal computers. Examples of the second operating system 220a(2) include MICROSOFT WINDOWS, APPLE MAC OS X, or RED HAT ENTERPRISE LINUX.

The central processor 220 communicates with an audio system 210, an image capture subsystem (e.g., camera, video or scanner) 212, flash memory 214, RAM memory 216, and a short range radio module 218 (e.g., BLUETOOTH), a Wireless Fidelity (WiFi) component (e.g., IEEE 802.11)) 219, and a wide area network (WAN) interface 221. The central processor communicatively couples these various components or modules through a data line (or bus) 278. The processor 220 also communicatively couples with a docking communication device 229. The power supply 240 powers the central processor 220, the radio subsystem 250, the screen 130 (driven by a display driver 230), which may be contact- or inductive-sensitive, and the docking communications device 229. The power supply 240 may correspond to a direct current source (e.g., a battery pack, including rechargeable) or an alternating current (AC) source. The power supply 240 powers the various components through a power line (or bus) 279.

The central processor 220 communicates with applications executing within the mobile computing device 110 through the operating systems 220a(1), (2) as described further below. In addition, intermediary components, for example, a window manager module 222 and a screen manager module 226, provide additional communication channels between the central processor 220 and operating system 220 and system components, for example, the display driver 230.

In one embodiment, the window manager module 222 comprises a software (e.g., integrated with the operating system) or firmware (lower level code that resides is a specific memory for that code and for interfacing with specific hardware, e.g., the processor 220). The window manager module 222 is configured to initialize a virtual display space, which may be stored in the RAM 216 and/or the flash memory 214. The virtual display space includes one or more applications currently being executed by a user and the current status of the executed applications. The window manager module 222 receives requests, from user input or from software or firmware processes, to show a window and determines the initial position of the requested window. Additionally, the window manager module 222 receives commands or instructions to modify a window, such as resizing the window, moving the window or any other command altering the appearance or position of the window, and modifies the window accordingly.

The screen manager module 226 comprises a software (e.g., integrated with the operating system) or firmware. The screen manager module 226 is configured to manage content that will be displayed on the screen 130. In one embodiment, the screen manager module 226 monitors and controls the physical location of data displayed on the screen 130 and which data is displayed on the screen 130. The screen manager module 226 alters or updates the location of data as viewed on the screen 130. The alteration or update is responsive to input from the central processor 220 and display driver 230, which modifies appearances displayed on the screen 130. In one embodiment, the screen manager 226 also is configured to monitor and control screen brightness. In addition, the screen manager 226 is configured to transmit control signals to the central processor 220 to modify power usage of the screen 130.

In addition, the mobile computing device includes a virtual manager module 228. The virtual manager module 228 comprises software that is configured to interface with the operating system 220a(1), 220a(2) as further described below. As is further described below, the virtual manager module comprises computer program code that can execute natively on the central processor 220 or execute through the first operating system 220a(1). The computer program code for the virtual manager module can comprise software, firmware, or a combination thereof that may be stored, for example, in the flash memory 214.

It is noted that in one embodiment, central processor 220 executes logic (e.g., by way of programmed code/instructions) corresponding to executing applications interfaced through, for example, the navigation area 140 or switches 170. It also is noted that numerous other components and variations are possible to the hardware architecture of the computing device 200, thus an embodiment such as shown by FIG. 2 is just illustrative of one implementation for an embodiment.

The radio subsystem 250 comprises a mobile (or cellular) communication system. It includes a radio processor 260, a radio memory 262, and a transceiver 264. The transceiver 264 may be two separate components for transmitting and receiving signals or a single component for both transmitting and receiving signals. In either instance, it is referenced as a transceiver 264. The receiver portion of the transceiver 264 communicatively couples with a radio signal input of the device 110, e.g., an antenna, where communication signals are received from an established call (e.g., a connected or on-going call). The received communication signals include voice (or other sound signals) received from the call and processed by the radio processor 260 for output through the audio system 210 and onto the speaker 120 or headset jack. The transmitter portion of the transceiver 264 communicatively couples a radio signal output of the device 110, e.g., the antenna, where communication signals are transmitted to an established (e.g., a connected (or coupled) or active) call. The communication signals for transmission include voice, e.g., received through the microphone 160 of the device 110, or other sound signals that is processed by the radio processor 260 for transmission through the transmitter of the transceiver 264 to the established call.

In one embodiment, communications using the described radio communications may be over a voice or data network. Examples of voice networks include Global System of Mobile (GSM) communication system, a Code Division, Multiple Access (CDMA system), and a Universal Mobile Telecommunications System (UMTS). Examples of data networks include General Packet Radio Service (GPRS), third-generation (3G) mobile (or greater), High Speed Download Packet Access (HSDPA), High Speed Uplink Packet Access (HSUPA), Long Term Evolution (LTE), and Worldwide Interoperability for Microwave Access (WiMAX).

While other components may be provided with the radio subsystem 250, the basic components shown provide the ability for the mobile computing device to perform radio-frequency communications, including telephonic communications. The communications can be voice or data. In an embodiment, many, if not all, of the components under the control of the central processor 220 are not required by the radio subsystem 250 when a telephone call is established, e.g., connected or ongoing. The radio processor 260 may communicate with central processor 220 using the data line (or bus) 278.

The card interface 224 is adapted to communicate, wirelessly or wired, with external accessories (or peripherals), for example, media cards inserted into the expansion slot (not shown). The card interface 224 transmits data and/or instructions between the central processor and an accessory, e.g., an expansion card or media card, coupled within the expansion slot. The card interface 224 also transmits control signals from the central processor 220 to the expansion slot to configure the accessory. It is noted that the card interface 224 is described with respect to an expansion card or media card; it also may be structurally configured to couple with other types of external devices for the device 110, for example, an inductive charging station for the power supply 240 or a printing device.

The docking communication device 229 is configured to communicatively couple with a docking station. The docking station comprises a hardware component that can physically or wirelessly (e.g., radio frequency and/or inductive) couple with the mobile computing device 110 and provide the mobile computing device 110 access to additional configuration options such as communication ports (e.g., universal serial bus (USB)). It is noted that when the mobile communication device 110 couples through the docking communication device 229 with the docking station, the mobile computing device 110 may be configured to trigger (automatically or manually) to wirelessly couple with peripherals, e.g., a keyboard, a mouse or a display, for example, via a wireless communications protocol such as BLUETOOTH or wireless home digital interface (WHDI).

Figure 3:
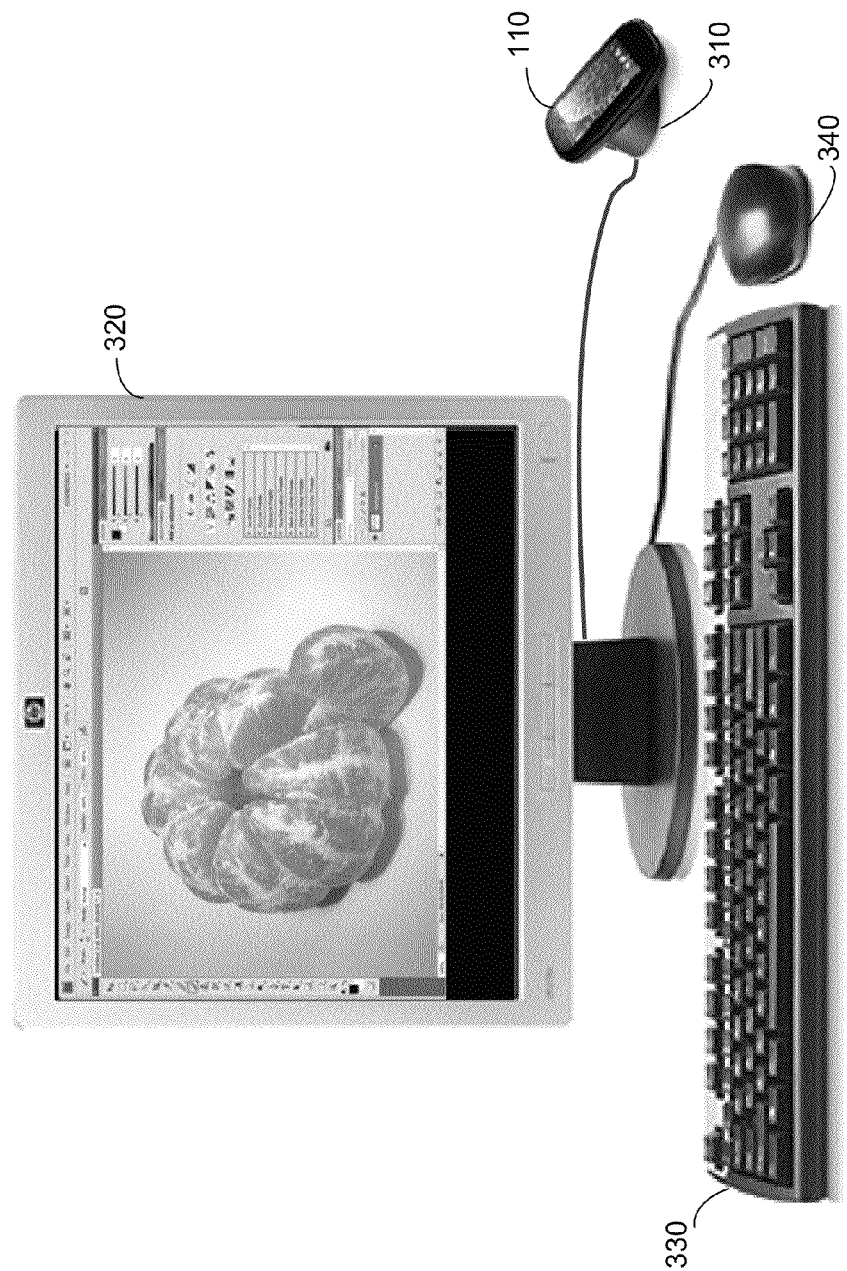
FIG. 3 illustrates one embodiment of an operational environment for a mobile computing device communicatively coupled with one or more peripherals.

It is noted that the mobile computing device 110 could be wirelessly coupled with peripherals via a BLUETOOTH communications coupling Operational Environment FIG. 3 illustrates an example embodiment of an operational environment for a mobile computing device communicatively coupled with one or more peripherals. Included in the example environment are the mobile computing device 110, a docking station 310, a monitor 320, a keyboard 330, and a pointing device, e.g., mouse, 340. The docking station 310 is configured to communicatively couple with the mobile computing device 110, e.g., through a wireless, inductive or wired connection, via the docking communication device 229. The docking station 310 is configured to include one or more ports, e.g., universal serial bus (USB) ports, and/or a radio subsystem, e.g., BLUETOOTH, WIFI DIRECT, TRANSFERJET, or UWB, to communicatively couple with peripheral devices such as the monitor 320, keyboard 330, and mouse 340. The docking station 310 may also be configured to connect with an electrical source and provide charging capability for the mobile computing device 110 and/or the peripherals that couple with it.

The monitor 320 is a conventional monitor that renders on its screen images (still and moving) from a device, e.g., the mobile computing device 110. It is noted that the monitor may be a stand-alone computer monitor or a device that can function as monitor, e.g., a television, projector or electronic billboard. The keyboard 330 is a conventional keyboard that provides an interface for inputting characters for use by applications and the operating systems of the mobile computing device 110. The mouse 340 is a conventional pointing device that provides yet another input mechanism for the applications and the operating systems of the mobile computing device 110.

In one embodiment the example environment configuration is structured so that when the mobile computing device 110 communicatively couples with the docking station 310, device drivers from within the mobile computing device 110 are initiated. The initiated device drivers drive the monitor 320, the keyboard 330, and the mouse 340 and allow these peripherals to interact with the mobile computing device 110. In particular, as will be further described below, the interaction is with the second operating system 220a(2) of the mobile computing device 110.

In the example configuration as noted, user may interact with the second operating system 220a(2) through the peripherals noted in FIG. 3, but that the first operating system 220a(1) continues to be operational also on the mobile computing device. Hence, if the first operating system 220a(1) is a smartphone operating system, e.g., PALM WEBOS, Blackberry OS, or iPhone OS, and the second operating system 220a(2) is a desktop operating system, e.g., WINDOWS 7, Chrome OS, MACOS X, or RED HAT LINUX OS, a user may interact with an ADOBE ACROBAT program executing on the second operating system 220a(2) through the peripherals but at the same time receive calls through a phone application executing on the first operating system 220a(1).

Dual Operating System Functional Configuration

Figure 4A:
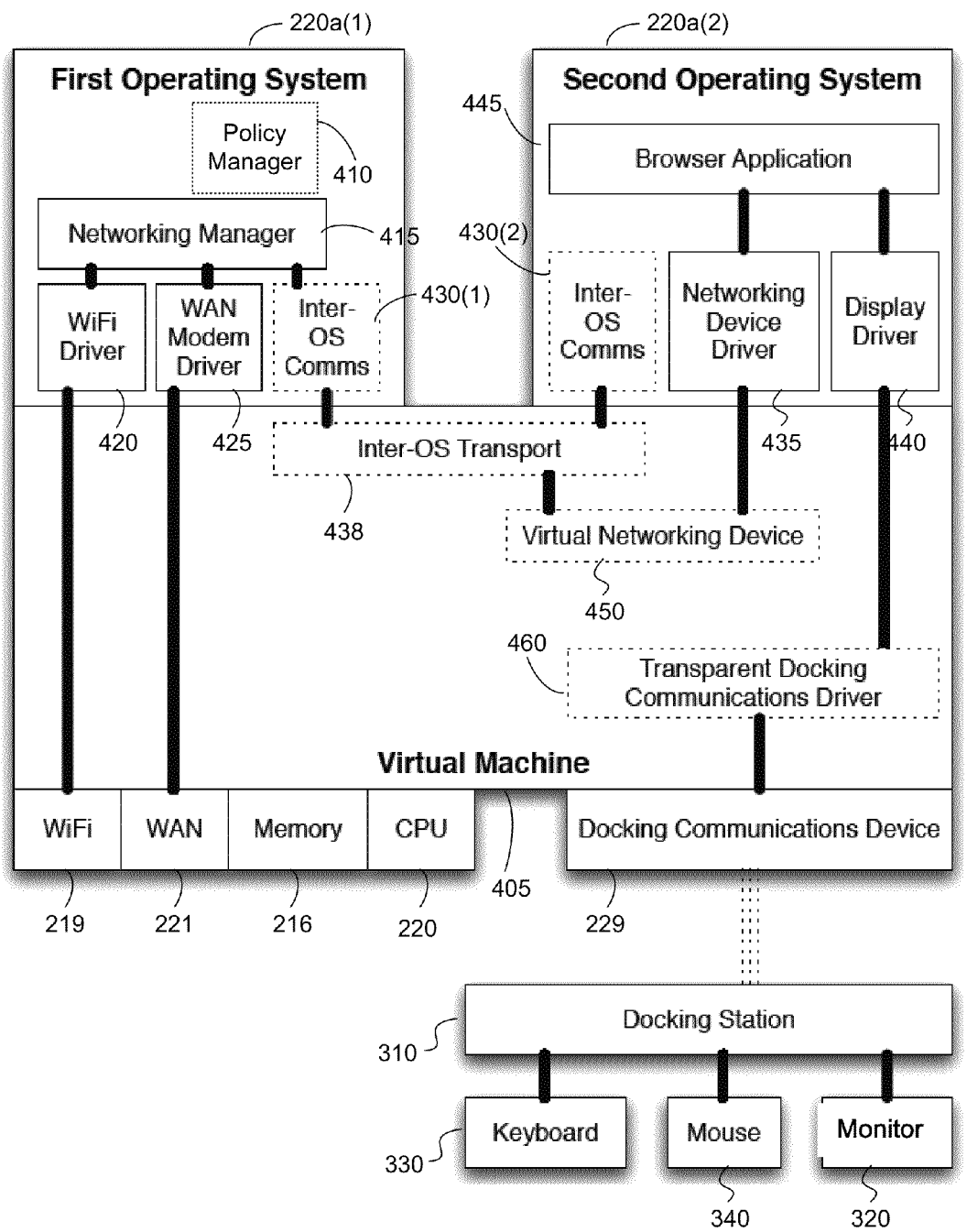
FIG. 4a illustrates a first embodiment of a dual operating system functional configuration.

Turning now to FIG. 4a, it illustrates a first embodiment of a dual operating system functional configuration for the mobile computing device 110. The embodiment includes the first operating system 220a(1), the second operating system 220a(2), and a virtual machine 405. The virtual machine 405 is a software (and/or firmware) layer that communicatively couples with the WiFi radio 219, the wide area network (e.g., a WAN modem) 221, the memory 216 and the processor (or CPU) 220. The virtual machine 405 also communicatively couples with a docking communication device interface 229. The docking communication device interface 229 communicatively couples with the external docking station 310. The docking station 310 couples with the monitor 320, the keyboard 330, and the mouse 340.

In the embodiment, the first operating system 220a(1) includes a policy manager 410, a networking manager 415, a WiFi driver 420, a wide area network (WAN) modem driver 425, and an inter-OS communication interface 430(1). The networking manager 415 communicatively couples with the WiFi driver 420, the WAN modem driver 425, and the inter-operating system (OS) communication interface 430(1). The networking manager 415 is a module 415 that is configured to provide access to the WiFi 420, the WAN modem 221, and an inter-operating system (OS) transport 438 (further described below), through the respective WiFi driver 420, the WAN modem driver 425, and the inter-OS communication interface 430(1). The networking manager 415 operates within the rules set by the policy manager 410. In general, the networking manager 415 manages link maintenance across the various network interfaces. The policy manager 410 is a module that is configured to set and manage access to hardware resources, e.g., the processor 220, the memory 216, and the networking components (e.g., the WiFi radio 219 or WAN modem 221).

The second operating system 220a(2) also includes an inter-operating system (OS) communication interface 430 (2), which interfaces with the inter-OS transport 438 (further described below). The second operating system 220a(2) also includes a networking device driver 435 and a display driver 440. The second operating system 220a(2) also includes one or more software applications. In this embodiment, illustrated is a browser application 445. Examples of a browser application include a web browser application such as INTERNET EXPLORER, FIREFOX, SAFARI, or CHROME.

Figure 4B:
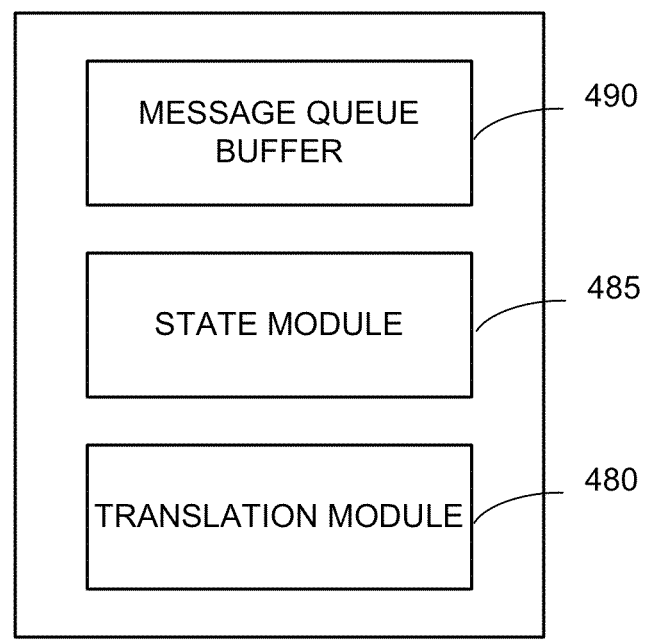
FIG. 4b illustrates an embodiment for an inter-operating system transport.

Turning briefly to FIG. 4b, it illustrates an example configuration for the inter-OS communications interface 430. The interOS communications interface 430 includes a translation module 480, a state module 485, and a message queue buffer 490. The translation module 480 is configured to translate commands and events (which are passed as messages) between the first operating system 220a(1) and the second operating system 220a(2). The state module 485 is configured to determine the state of the second operating system 220a(2).

The message queue buffer 490 is configured to queue messages between the first operating system 220a(1) and the second operating system 220a(2).

By way of example, when a command (e.g., run program) is to be sent from the first operating system 220a(1) to the second operating system 220a(2), the translate module translates and prepares a message for the command to be sent to the second operating system 220a(2). The state module 485 determines whether the second operating system 220a(2) is operational (state is ON) or not. If the second operating system 220a(2) is awake (state is ON) then the message is queued in the message queue buffer 490 to immediately send to the second operating system 220a(2). Alternately, when the second operating system 220a(2) is in the ON state the message queue buffer 490 may be altogether bypassed and the message sent directly without a need for buffering. If the second operating system 220a(2) is in an OFF state, the message is queued in the message queue buffer 490 for subsequent transmission when the second operating system 220a(2) is in an ON state. It is noted that on the receiving side the translate module 430(2) is optional in this configuration.

Referring back to FIG. 4a, the virtual machine 405 includes the inter-OS transport 438, a virtual networking device 450 and a transparent docking communications driver 460. The inter-OS transport 438 communicatively couples with the inter-OS communications interface 430(1) of the first operating system 220a(1) and the inter-OS communications interface 430(2) of the second operating system 220a(2). The virtual networking device 450 communicatively couples with the networking device driver 435 of the second operating system 220a(2) and the inter-OS transport 438. The transparent docking communications driver 460 communicatively couples the display driver 440 of the second operating system 220a(2) and the docking communication device interface 229.

Referring now to the inter-OS transport 438, it provides an intermediary interface to facilitate communications between the first operating system 220a(1) and the second operating system 220a(2). The virtual networking device 450 is configured as a virtual interface. When the networking device driver 435 of the second operating system 220a(2) sends commands, the virtual networking device 450 appears to be a physical connection of the mobile computing system 110. The virtual networking device 450 receives the commands and sends them to the inter-OS transport 438.

The transparent docking communications driver 460 is configured to provide a driver interface for the second operating system 220a(2) to appear as a conventional driver interface. Accordingly, when the second operating system 220a(2) sends a command to display a particular graphical or text user interface, it sends the commands to the display driver 440. The display driver 440 transmits the command to the transparent docking communications driver 460, which appears to the display driver 440 as a physical connection to the monitor 320. In this configuration, the transparent docking communications driver 460 is a virtual device driver. The transparent docking communications driver 460 receives the commands to drive the monitor 320 and translates those commands to a driver commands that are actionable by the docking communication device interface 229 of the mobile computing device 110. The docking communication device interface 229 sends the commands to drive the monitor 320 through the docking station 310 and display what the second operating system 220a(2) provided.

Figure 5:
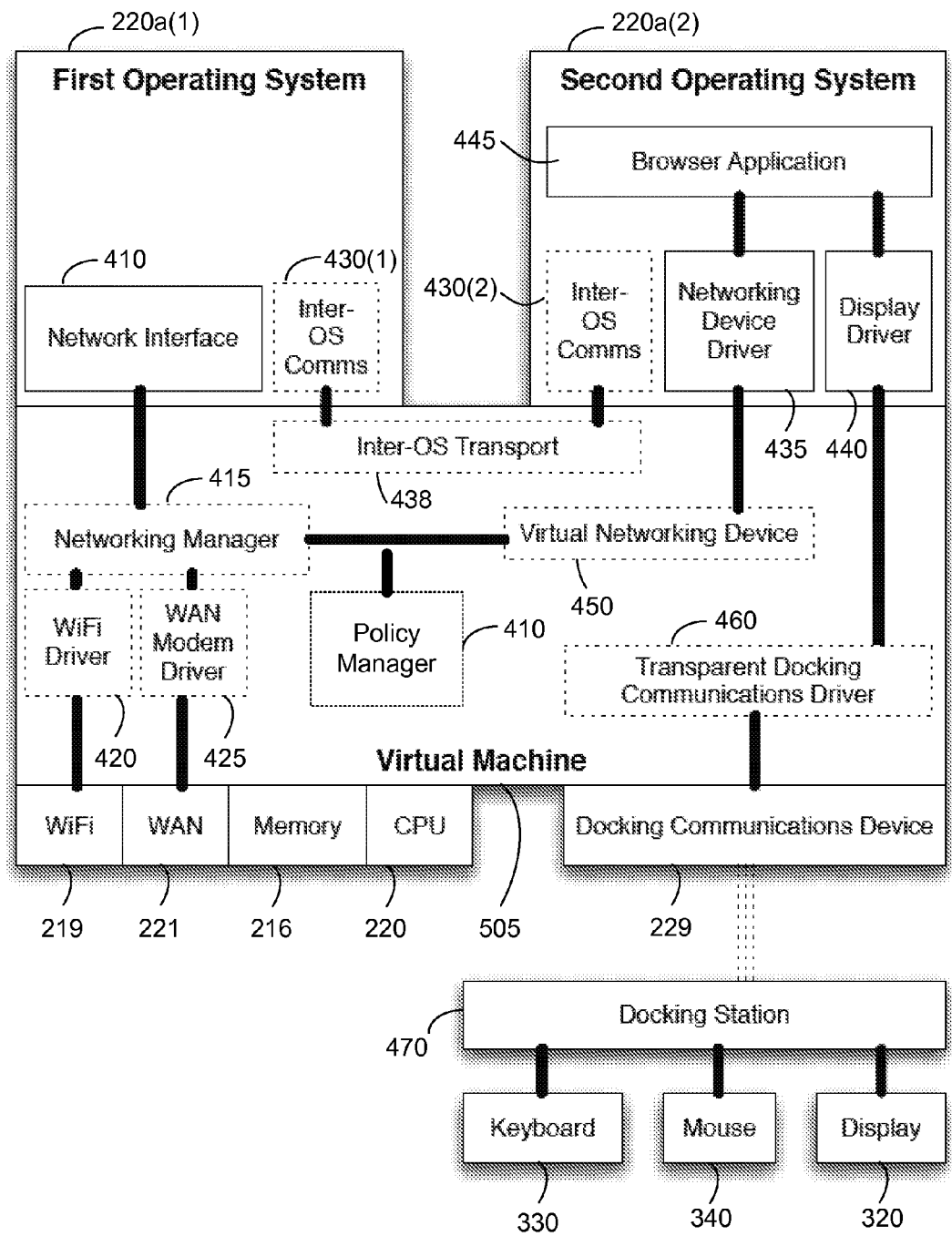
FIG. 5 illustrates a second embodiment of a dual operating system functional configuration.

FIG. 5 illustrates a second embodiment of a dual operating system functional configuration for the mobile computing device 110. This configuration includes the first operating system 220a(1), the second operating system 220a(2), and a virtual machine 505. In this configuration, the second operating system 220a(2) is configured as described in FIG. 4a. The first operating system 220a(1) is now configured to include the network interface 410 and a network manager 415, a WiFi driver 420, and a WAN modem driver 425 are configured within the virtual machine 505. These components 415, 420 and 425 of the virtual machine 505 now communicatively couple (or interface) with the respective WiFi 219 and WAN modem 221 for both the first operating system 220a(1) and the second operating system 220a(2). In addition, the policy manager 410 is now in the virtual machine 505 and is used by the virtual machine 505 to manage resource access and use. Examples of resources managed include the memory 216, the WiFi 219, and the WAN 221.

Figure 6:
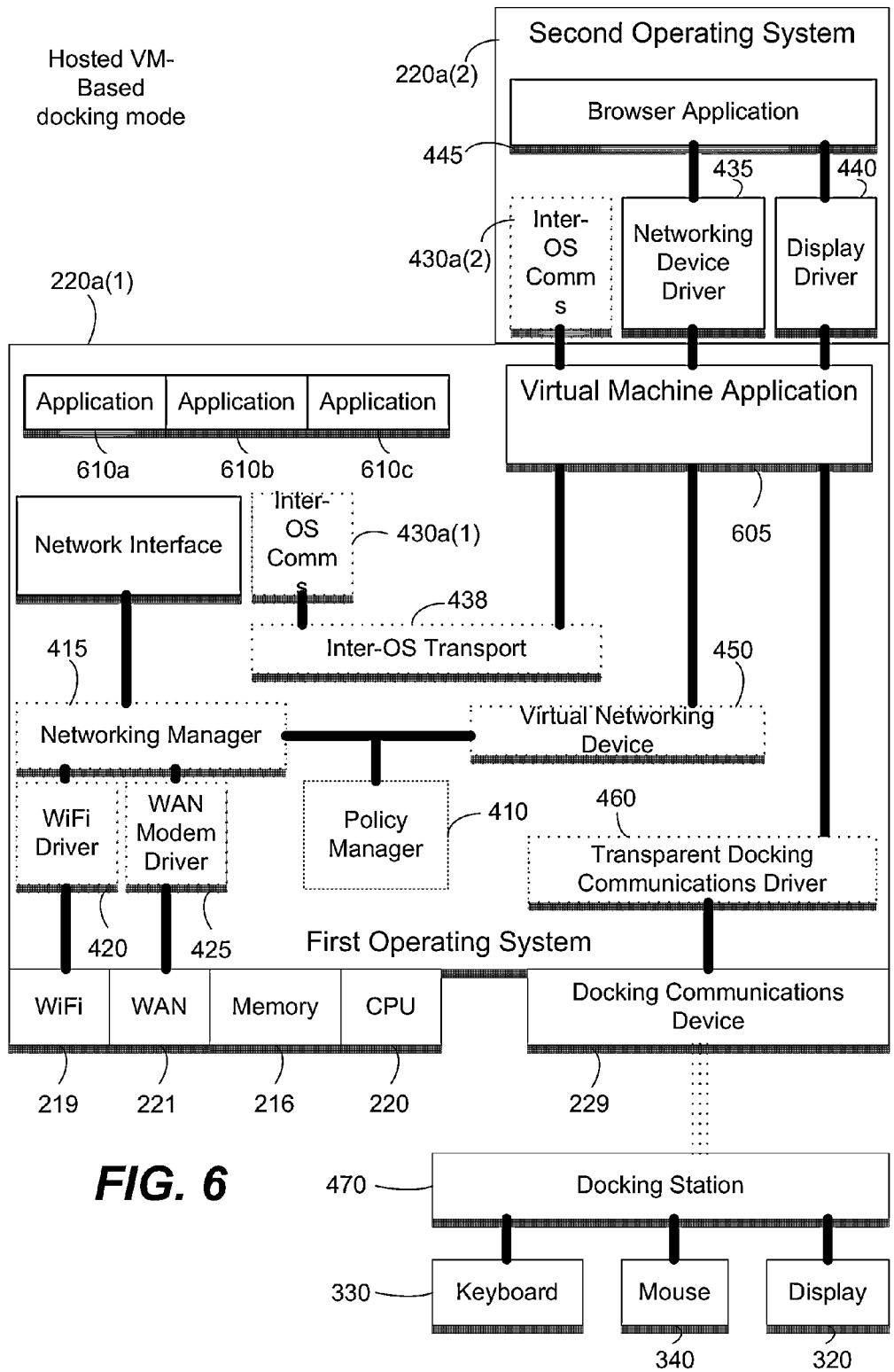
FIG. 6 illustrates a third embodiment of a dual operating system functional configuration.

FIG. 6 illustrates a third embodiment of a dual operating system functional configuration for the mobile computing device 110. This configuration includes the first operating system 220a(1) and the second operating system 220a(2). The second operating system 220a(2) is similar to the second operating system 220a(2) described with FIG. 4a. The first operating system 220a(1) includes the components described in FIG. 4a, but now also includes a virtual machine application 605, the inter-OS transport 438, the virtual networking device 450 and the transparent docking communications driver 460. In this configuration, the second operating system 220a(2) inter-OS communications module 430a(2), networking device driver 435 and display driver 440 communicatively couple (or interface) with the virtual machine application 605 in the first operating system 220a(1). The virtual machine application 605 interfaces with the inter-OS transport 438, the virtual networking device 450, and the transparent docking communication driver 460 as described to operate as described in FIG. 4a with respect to communicatively coupling with resources, for example, the WiFi 219, the WAN 221, the docking communications device 229.

Figure 7:
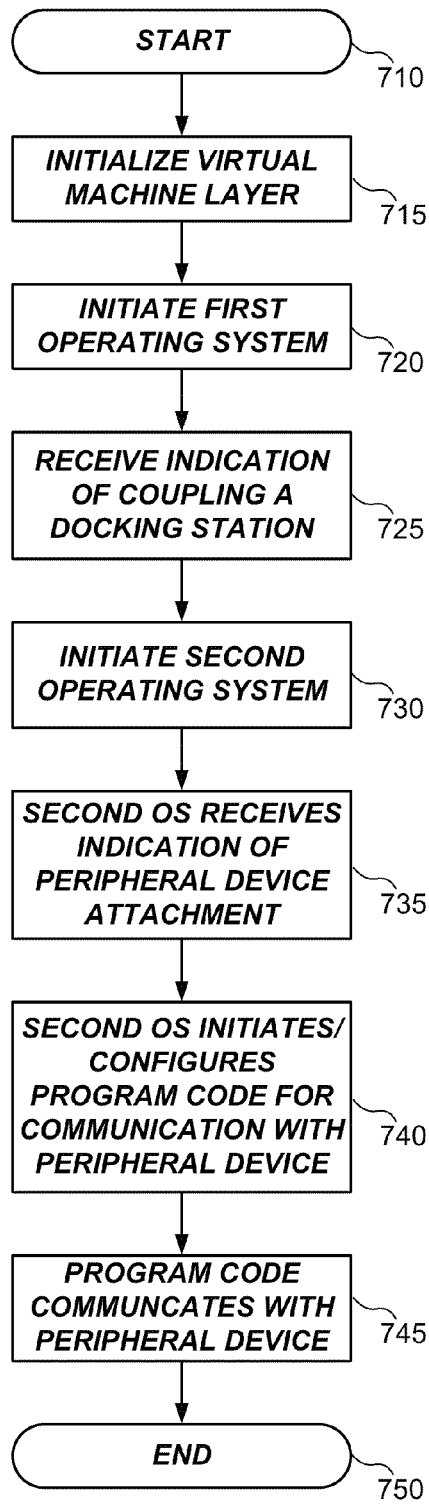
FIG. 7 illustrates a flowchart of one embodiment of a process for communicatively coupling a second operating system with a peripheral device.

Turning now to FIG. 7, it illustrates a flowchart of one embodiment of a process for communicatively coupling a second operating system with a peripheral device, for example, the monitor 320, the keyboard 330 and/or the mouse 340. By way of example, the process may be configured using one of the architectural configurations described in FIGS. 4a, 5, and 6. The process starts 710 and initializes 715 a virtual machine layer (e.g., the virtual machine 405, 505, or 605). The process also initializes the first operating system 220a(1). It is noted that the first operating system 220a(1) and the virtual machine layer can be initialized in either order depending on which configuration is applicable as previously described. In addition, the second operating system 220a(2) may be initialized at the time the first operating system 220a(1) and the virtual machine layer are initialized.

The process continues as the mobile computing device 110 communicatively couples with the docking station 310. Specifically, the mobile computing device 110 receives 725 an indication of the communications coupling, e.g., a signal received due to an inductive, a wireless (e.g., radio), or a physical communication coupling between the mobile computing device 110 and the docking station 310. If the second operating system 220a(2) has not already been initialized, the process initializes 730 the second operating system 220a(2). The second operating system 220a(2) receives 735 an indication that the mobile computing device 110 is communicatively coupled with a peripheral device. As noted above to the second operating system 220a(2), the connection appears to be a direct connection (or direct through the docking station 310).

The second operating system 220a(2) initiates or configures 740 driver program code for communication with the peripheral device and communicates 745 with it. Specifically, the display driver 440 of the second operating system transmits and receives messages that are received or transmitted by the transparent docking communication driver 460. The transparent docking communications driver 460 interfaces with the docking communications device 229, which interfaces with the docking station 310. In this configuration, the second operating system 220a(2) believes it is directly communicating with the docking device 310, but is actually interfacing with the transparent docking communications driver 460 in the virtual machine (405, 505) or the first operating system 220a(1) depending on the particular dual operating system configuration implemented.

Figure 8:
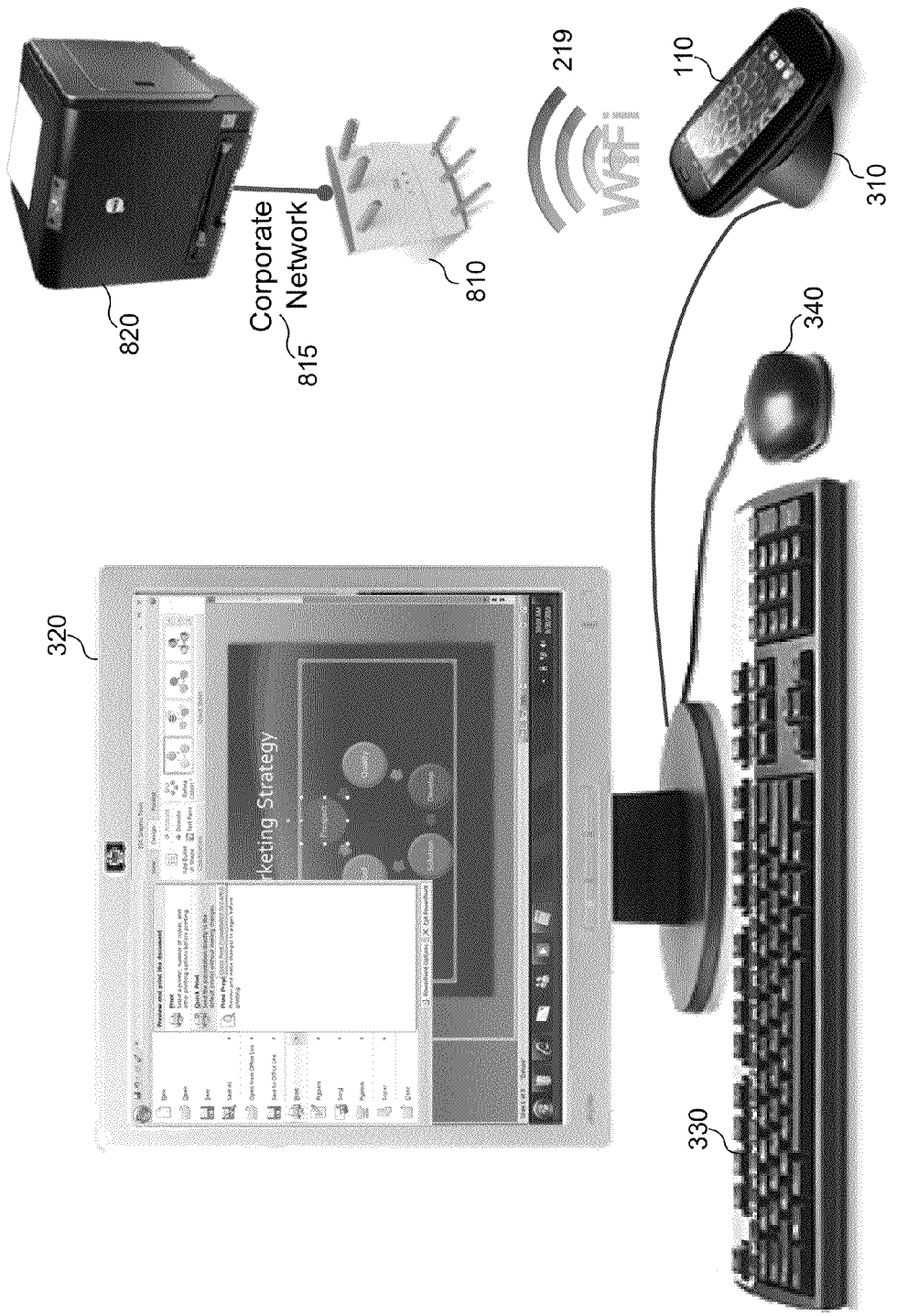
FIG. 8 illustrates an example operational configuration of a second operating system in a mobile computer device communicatively coupled with one or more peripherals.

With communications between the second operating system 220a(2) and the docking station 310 established, FIG. 8 illustrates an example operational configuration between the second operating system 220a(2) and one or more peripherals. In this example, the second operating system 220a(2) has access to a corporate network 815 via a WiFi access point 810 using the mobile computing device WiFi radio 219. Attached to the corporate network 815 is a printer 820. When a user uses an application on the second operating system 220a(2), for example, MICROSOFT POWERPOINT, the user interact with the application using the monitor 320, the keyboard 330, and the mouse 340. When it is time to print the presentation, the user is able to print to the printer 820 through the corporate network 815 using the WiFi radio 219 communications coupling with the access point 810. Specifically, the second operating system 220a(2) is communicating with the WiFi radio 219 through the networking manager 415 and the WiFi driver 420, which communicates with the network (or intranet or internet) through the WiFi radio 219. Additional examples of operation are provided below.

Execution of Application in Second Operating System

Figure 9:
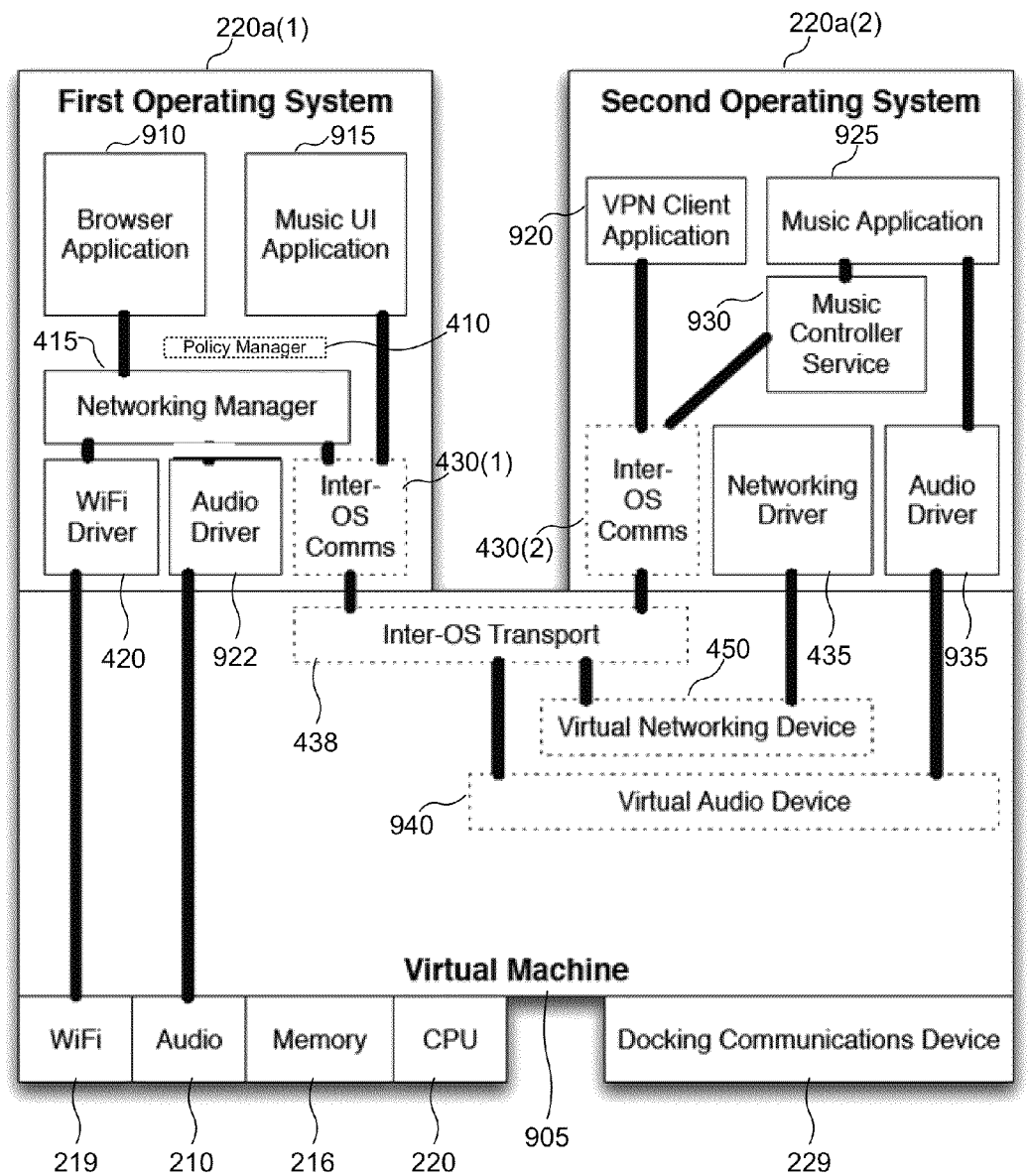
FIG. 9 illustrates a first example operational embodiment for executing an application program within a second operating system through the first operating system.
Figure 10:
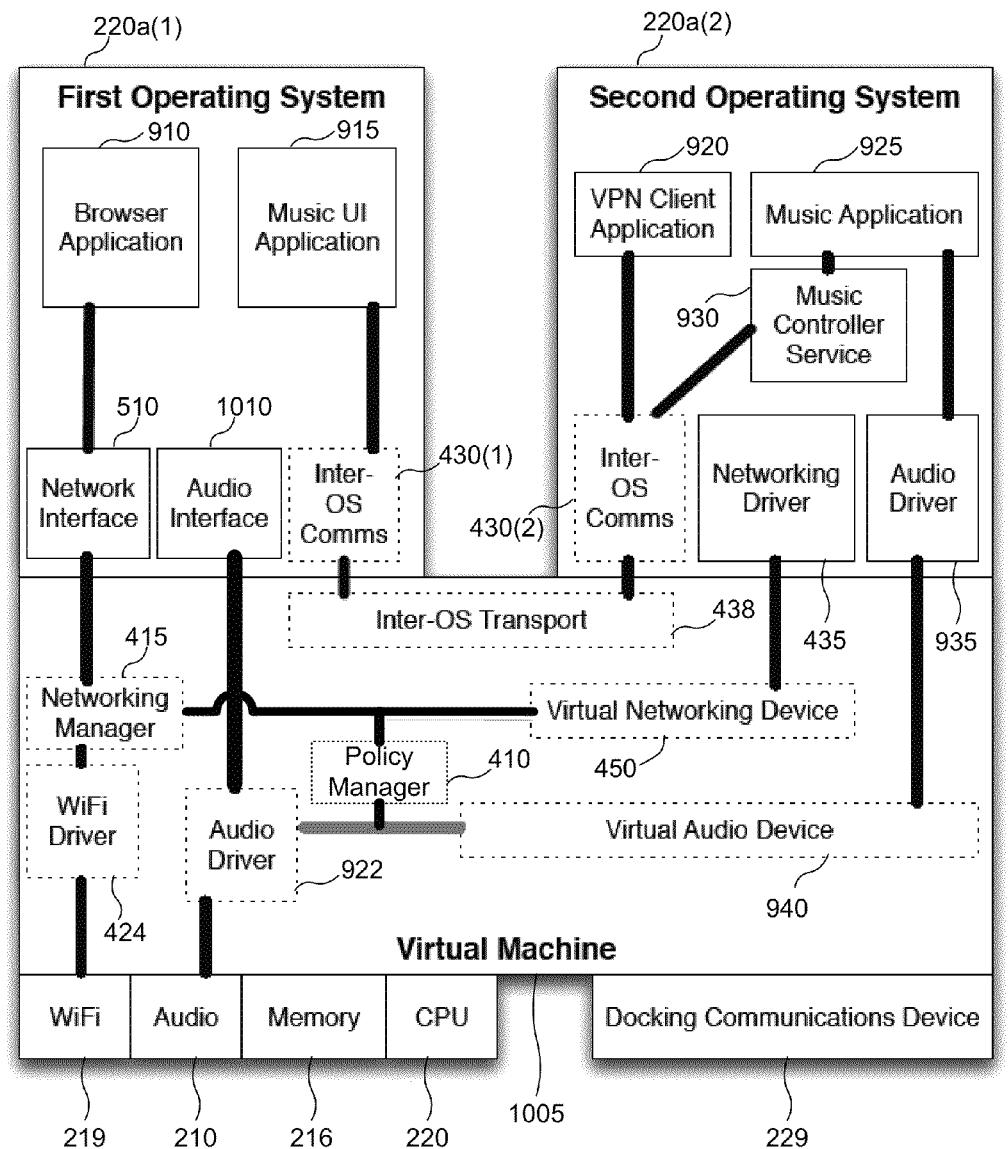
FIG. 10 illustrates a second example operational embodiment for executing an application program within a second operating system through the first operating system.
Figure 11:
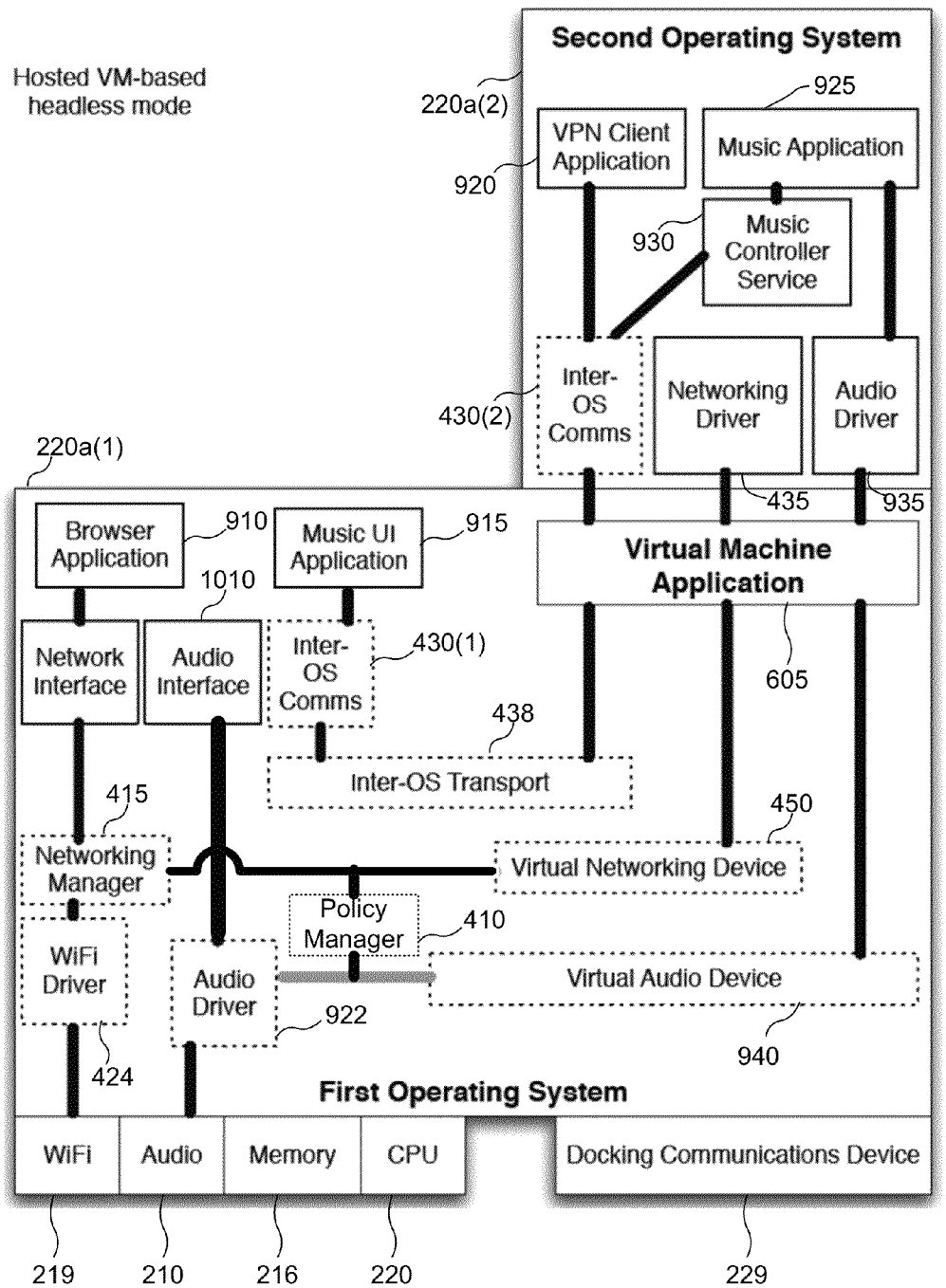
FIG. 11 illustrates a third example operational embodiment for executing an application program within a second operating system through the first operating system.

FIGS. 9 through 11 illustrate two different examples of interactions involving the first operating system 220a(1) and the second operating system 220a(2) using one of the three example dual operating system configurations illustrated and described with FIGS. 4a, 4b, 5 and 6. A first example will be for the first operating system 220a(1) executing an application executable through the second operating system 220a(2). A second example will be for virtual private network access and operation.

Referring first to FIG. 9, described is a first example operational embodiment for executing an application program within a second operating system 220a(2) through the first operating system 220a(1). In this example, the application program is a media application (or media playback application). The particular media application is referenced as a music application 925 and will be described in the context of audio selection and playback. The structural configuration of the operating environment is similar to that described with FIG. 4a. In this configuration, the first operating system 220a(1) includes a browser application 910, a music user interface (UI) application 915 and an audio driver 922 in addition to the prior components described with FIG. 4a. The browser application 910 is a conventional browser application such as INTERNET EXPLORER, FIREFOX, CHROME, or SAFARI. The browser application 910 communicatively couples the networking manager 415.

The first operating system 220a(1) includes the music UI application 915 for a user to interact with though the screen 130 of the mobile computing device. The interactions are captured by the music UI application 915 and are used to generate instructions to transmit to the music application 925 and/or provide for display information received back from the music application 925. The music UI application 915 may be a separate software program that communicatively couples with, and can transmit commands or receive information from, the music application 925 operational within the second operating system 220a(2). In one embodiment, the music UI application 915 provides a selectable user interface corresponding to controls for a music application. The commands on the music UI application 915 include, for example, "PLAY", "FAST FORWARD", "PAUSE", or "REWIND". The music UI application 915 also can be configured to render (or draw) information received back from the music application 925, for example, playlists and music track information. The audio driver 922 is configured to drive the audio system 210 of the mobile computing device 110, for example, to play back sound through a speaker or a headset jack.

The second operating system 220a(2) includes a virtual private network (VPN) client application 920, the music application 925, a music controller service 930, and an audio driver 935 in addition to the prior components described with FIG. 4a. The VPN client application 920 is a conventional VPN application such as CISCO VPN CLIENT, and will be described further below with a second example. The music application 925 is a conventional personal computer media application such as iTUNES or WINDOWS MEDIA PLAYER. In this example, a music (audio) playback configuration is described. The music controller service 930 is a service configured to provide control services for the music application 925. The audio driver 935 is configured to drive an audio interface, for example, a virtual sound card or audio device, which then can transmit sound through a speaker or a headset jack.

In the example illustrated with FIG. 9, the virtual machine 905 includes a virtual audio device 940 in addition to the components illustrated and described with FIG. 4a. The virtual audio device 940 is configured to receive an audio stream driven by the audio driver 935 of the second operating system 220a(2). The virtual audio device 940 transmits the received audio stream to the inter-OS transport 438 for transmission to the first operating system 220a(1). The inter-OS transport 438 transmits the audio stream to the inter-OS communications module 430(1) for subsequent playback through the audio interface 210 via audio driver 922 of the mobile computing device 110.

Turning now to an example operation, in this example the music application 925 is executable only through the second operating system 220a(2). When a user seeks to access the music application 925, the user launches the music UI application 915 through the first operating system 220a(1). Accordingly, a user interface is rendered on the screen 130 of the mobile computing device 110. To play a selection from a playlist, a user may retrieve a playlist through the user interface music UI application 915 and make a selection within it. Specifically, the user may highlight a selection within a playlist and select a "PLAY" button from the music application UI 915 on the screen 130. The selection generates a "PLAY" instruction that is transmitted to the inter-OS communication module 430(1) in the first operating system 220a(1).

The translation module 480 of the inter-OS communications module 430(1) receives the "PLAY" instruction and translates it into a message for a PLAY command receivable and executable by the music application 925 in the second operating system 220a(2) via the music controller service 930. The state module 485 determines the state of the second operating system 220a(2). If the second operating system 220a(2) is in an ON state the message is sent via the inter-OS transport 438 to the inter-OS communications module 430(2) of the second operating system 220a(2). If the second operating system 220a(2) is in an OFF state, the message is queued in the message queue buffer 490. When the second operating system 220a(2) is in the ON state, the queued message is sent via the inter-OS transport 438 to the inter-OS communications module 430(2) of the second operating system 220a(2). It is noted that a state machine or state module may also be included in the configuration to control the state of various modules. For example, a state module can manage a state of the music application 925, where the state may include running, suspended, or the like.

When the inter-OS communications module 430(2) of the second operating system 220a(2) receives the "PLAY" command message, it is transmitted to the music controller service 930. The music controller service 930 generates a play instruction for the music application 925 to retrieve and play the selection. The music application 925 transmits an audio playback stream of the selection to the audio driver 935. The second operating system 220a(2) and the audio driver 935 are configured to directly drive an audio stream to an audio device, i.e., it appears to the audio driver 435 that it is directly driving the audio device.

The audio driver 935 drives the audio stream to a virtual audio device 940 in the virtual machine 905, which to the audio driver 935 appears as the actual audio device. The virtual audio device 940 receives the audio stream and transmits it to the inter-OS transport 438 and then to the inter-OS communications module 430(1) in the first operating system 220a(1). The inter-OS communications module 430(1) transmits the audio stream to the audio driver 920 of the first operating system 220a(1) via the networking manager 415. The audio driver 920 drives the audio stream to the audio system 210, e.g., a speaker or a headset jack, of the mobile computing device 110.

It is noted that the music UI application 915 may be further configured to receive from the music controller service 930, the selection playback information, e.g., selection metadata and playback time, available through the music application 925. This information comes via the inter-OS communications module 430(2) of the second operating system 220a(2) (to translate the message for the first operating system 220a (1)), the inter-OS transport 438, and the inter-OS communications module 430(1) of the first operating system 220a(1).

From this configuration a music application only operable through the second operating system 220a(2) advantageously can be played back through the first operating system 220a (1). The music application is not altered in order to interact with music application through the first operating system 220a(1). Moreover, playback information from the music application 925 playing in the second operating system 220a (2) is made available through the music UI application 915 of the first operating system 220a(1) for the user to interface with it.

The operating environments corresponding to the embodiments in FIGS. 10 and 11 also are configured to allow a user to interact with a music UI application 915 to play the music application 925 in the second operating system 220a(2). Referring to FIG. 10, it illustrates a second example operational embodiment for executing the music application program 925 within the second operating system 220a(2) through the first operating system 220a(1). The structural configuration of the operating environment is similar to that described with FIG. 5. In this configuration, the first operating system 220a(1) includes the browser application 910 and the music user interface (UI) application 915 in addition to the prior components described with FIG. 5. It also includes an audio interface 1010. It is noted that the audio interface 1010 is functionally similar to audio driver 935 of the second operating system 220a(2) in this aspect of the configuration. The second operating system 220a(2) includes the components described with respect to FIGS. 5 and 9. A virtual machine 1005 in this configuration includes the virtual audio device 940 and a virtual audio driver 922 in addition to the components illustrated and described with FIG. 5.

By way of example operation, when a user makes a selection through the music UI application 915 and the music application 925 continues with playback of the selection, the audio driver 935 drives the virtual audio device 940. The virtual audio device 940 drives the audio driver 922 in the virtual machine 1005. The virtual audio driver 922 communicatively couples the audio interface 1010 of the first operating system 220a(1) and the audio system 210, e.g., a sound card coupled with a speaker or headset jack, to audibly playback the selection for the user. It also includes an audio interface 1010. It is noted that the audio interface 1010 is functionally similar to audio driver 935 of the second operating system 220a(2) in this aspect of the configuration.

Turning next to FIG. 11, it illustrates a third example operational embodiment for executing the music application program 925 within the second operating system 220a(2) through the first operating system 220a(1). The structural configuration of the operating environment is similar to that described with FIG. 6. In this configuration, the first operating system 220a(1) includes the browser application 910, the music user interface (UI) application 915, the audio interface 1010, and the virtual audio driver 922 in addition to the prior components described with FIG. 6. The second operating system 220a(2) includes the components described with respect to FIGS. 5, 9, and 10. The virtual machine 605 in this configuration is as illustrated and described with FIG. 6.

By way of example operation, when a user makes a selection through the music UI application 915 and the music application 925 continues with playback of the selection, the audio driver 935 drives the audio stream to the virtual machine 605. The virtual machine 605 sends the audio stream to the virtual audio device 940 in the first operating system 220a(1). The virtual audio device 940 communicatively couples the virtual audio driver 922, which interfaces with the audio interface 1010, to drive the audio system 210, e.g., a speaker or headset jack. It is noted that the audio device 940 "looks" like a standard audio device that the audio driver 935 would expect to support in a desktop operating system on desktop hardware, e.g., a sound card. In such configuration, the virtual audio driver 940 is pretending to be the hardware when in reality it is exposing the hardware, e.g., audio system 210, that is optimized for the mobile computing device 110 architecture.

In each of the three example configurations illustrated and described with FIGS. 9, 10, and 11, a music application 925 executable only in the second operating system 220a(2) can be interfaced through a music UI application 915 in the first operating system 220a(1). Through the interface, the music application 925 can be operated as though it was present within the first operating system 220a(1) on the device. Such configurations can beneficially expand the number of executable applications on a mobile computing device 110. The configuration also provides user interface continuity as a user interface for the first operating system 220a(1) can be consistency rendered relative to other applications for use with applications on the second operating system 220a(2). Moreover, the UI application can be kept separate from the application itself on the second operating system 220a(2), thereby eliminating the need to rewrite the application for use with the first operating system.

The configurations as described above also can be extended to provide other functionality, for example, virtual private network (VPN) access. Referring back to FIGS. 9, 10, and 11, the second operating system 220a(2) includes a VPN client application 920, for example, the CISCO VPN CLIENT. In this example, the VPN client application 920 is executable only through the second operating system 220a(2).

To launch the VPN application 920, the first operating system 220a(1) may include a VPN user interface (UI) application (not shown) to allow manual launch of the VPN client application 920 on the second operating system 220a(2). In this configuration, when the VPN UI application is launched and a "CONNECT" selection is made. The CONNECT selection transmits a VPN connection request message that begins the process of establishing communications through a secured communications link (e.g., a private network tunnel). The connection request message is sent from the first operating system 220a(1) to the second operating system 220a(2) through the first inter-OS communications module 430(1), the inter-OS transport 438, and the second inter-OS communications module 430(2).

The VPN client application 920 receives the connection request message and begins the process of establishing a VPN communications link. In particular, the VPN client application 920 establishes the communications link through the networking driver 435 in the second operating system 220a(2). From the second operating system 220a(2) perspective, the network driver 435 appears to directly drive the network interface, for example, the WiFi 219. However, the network driver 435 connection message (or signal) interfaces with the virtual networking device 450 as illustrated and described with respect to FIGS. 9 and 10 or with the virtual machine 605 and then the virtual networking device 450 as illustrated and described in FIG. 11.

From the virtual networking device 450, the connection message is transported through the system depending on the particular dual operating system configuration. For example, in the configuration illustrated and described in FIG. 9, the virtual networking device 450 transmits the connection message to the inter-OS transport 438 and inter-OS communications module 430(1) before being passed on to the networking manager 415. The networking manager 415 transmits the connection message to the WiFi driver 420 as described and illustrated through FIG. 9.

In an alternate embodiment, the VPN client application 920 may be launched automatically. By way of example, in an automatic launch configuration, the browser application 910 can be configured to interoperate with the VPN UI application (or functionally similar). When access to a secured web site is attempted through the browser application 910, the browser application 910 sends a VPN connection request message to the VPN client application 920 through the VPN UI application interface, which travels a path as described previously. The VPN client application 920 receives the message and begins the connection process that to the VPN client application 920 and second operating system 220a(2) appears to be a direct network connection. However, the connection is actually through the virtual machine configurations as described above and as illustrated and described with respect to FIGS. 9, 10 and 11.

As described, VPN access in a dual operating system configuration provides a cost-effective and efficient mechanism for establishing a VPN tunnel and accessing secured network without the need for developing a separate VPN client application 920 for the first operating system. Moreover, the VPN UI application is an optional user interface, but is not necessary for the passing a connection request message to the VPN client application 920. The system can be configured so that the connection request message is "hard coded" into those applications requiring VPN access, for example, particular browser sessions that connect to secured web sites. Alternately, the connection request and VPN session may be established based on a predefined policy, e.g., a connection to public (unsecured) network or a URI or URL domain that a particular HTTP request from an application (on either the first operating system 220a(1) or the second operating system 220a(2)) may want to access. For example, if an application such as a browser, an email application, or a file manager wants to access an address that is on a secured corporate domain (e.g., ".hp.com"), the system could automatically establish a VPN connection.

Figure 12:
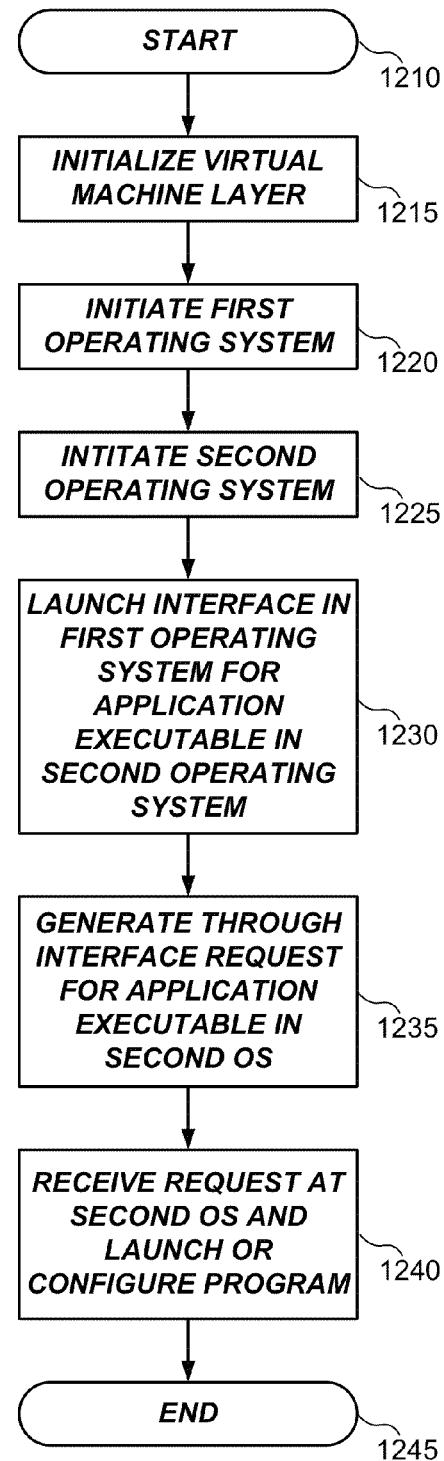
FIG. 12 illustrates a flowchart of one embodiment for a process of executing an application program within a second operating system through the first operating system.

Turning now to FIG. 12, it illustrates a flowchart that summarizes one example embodiment for a process of executing an application program, e.g., a music application, a virtual private network (VPN) client application, or a photo editing application, within the second operating system 220a(2) through the first operating system 220a(2). The process starts 1210 and, if necessary, initializes 1215 a virtual machine layer. Similarly, if necessary, the process initiates 1220 the first operating system and initiates 1225 the second operating system. To execute an application in the second operating system 220a(2), the process is configured to launch 1230 an interface to the application within the first operating system 220a(1). The interface can be configured as a separate application program. The interface is configured to receive input, for example, from a user, to control the application within the second operating system 220a(2). The application and the second operating system 220a(2) identify the received input as though it is being directly received rather than through the first operating system 220a(1). Accordingly, the application at the second operating system 220a(2) responds accordingly, for example, launching or configuring 1240 the application depending on the input received from the application user interface of the first operating system 220a(1). It is noted that in alternate embodiments, the second operating system 220a(2) can be initiated between steps 1230 and 1235 or 1235 and 1240.

It is also noted that in an alternate embodiment, the second operating system 220a(2) may include one or more accounts (for example, in WINDOWS 7). The configuration as described may use a global positioning system (GPS) component or a hotspot detector (in the case of WiFi) to determine the location of the mobile computing device 110 and thereafter initiate access to a particular account of the second operating system 220a(2). In yet another embodiment, the mobile computing device 110 may include two or more selectable operating systems for use as the second operating system 220a(2). In such configurations, the GPS or the hotspot detector for WiFi can be used to identify a location of the mobile computing device 110 and initiate a particular operating system from among the two or more second operating systems. In both configurations, in one embodiment the mobile computing device 110 may be configured to include a pre-stored table or pre-stored initiation configuration parameters that match a detected location with a particular account and/or particular second operating system.

Application or Data on First OS Rendered Through Second OS

Figure 13:
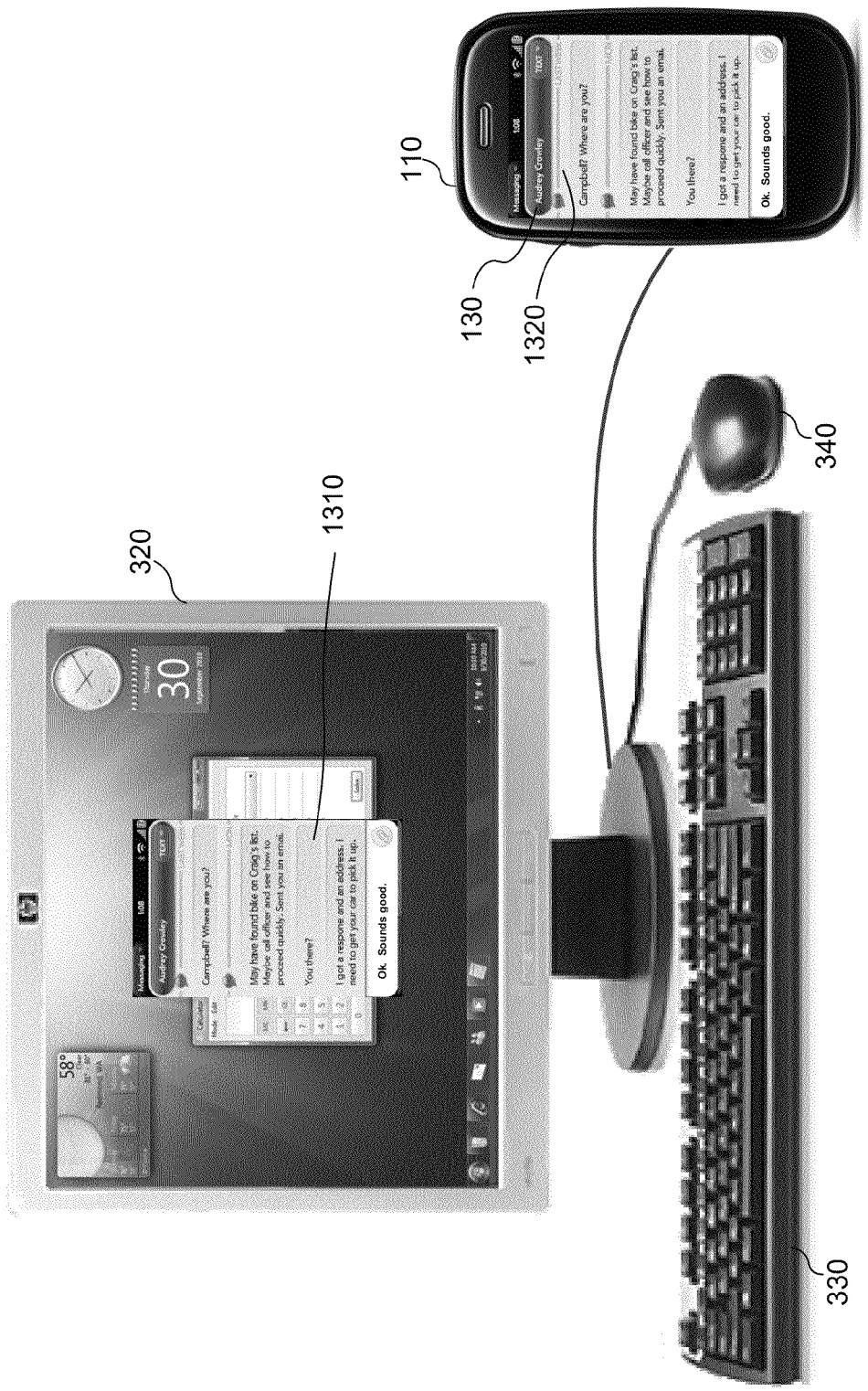
FIG. 13 illustrates an example embodiment of an application executed by a first operating system on the mobile computing device and rendered for display through the second operating system.

The dual operating system configurations described also can allow for the user interface screens of the first operating system 220a(1) to appear on the monitor 320 when the mobile computing system 110 is docked and the second operating system 220a(2) is operational. FIG. 13 illustrates an example embodiment of an application executed on the first operating system 220a(1) of the mobile computing device 110 and rendered for display through the second operating system 220. The example illustrates the mobile computing device 110 that is docked (dock not shown), the second operating system active and displayed on the monitor 320, the keyboard 330 and mouse 340 input devices, and an application (a messaging application in this example) in the first operating system 220a(1) that is active and displayed within a window 1310 on the monitor 320. The window 1310 displayed on the monitor 320 may be within the second operating system 220a(2). The application is also displayed in a window 1320 rendered on the screen 130 of the mobile computing device 110.

In this configuration, the second operating system 220a(2) is configured to include interface that displays the screen of the first operating system 220a(1) and allows interaction with the application, for example, through the keyboard 330 and mouse 340. Here, the first operating system 220a(1) may forward to the second operating system 220a(2) a browser session that includes the user interface from the mobile computing device 110 first operating system 220a(1) for display on the monitor 320 within a browser of the second operating system 220a(2). In an alternate embodiment, the configuration can be structured so that data from the first operating system 220a(1) is passed within the mobile computing device 110 to the second operating system 220a(2). The data received by the second operating system 220a(2) and prepared in the context of the user interfaces of applications (generally available or customized) of the second operating system 220a(2) for presentation on the monitor 320.

Accordingly, in one embodiment, the information is exposed via a service(s) or application(s) running in the second operating system 220a(2), which would interact with the inter-OS communication transport 435 and layers 430 to direct events back and forth between the two operating systems 220(2), (1). The data could be presented on the screen, within second operating system 220(2), either through one or more applications or through a browser, for example, served through the first operating system 220a(1). The view and interaction can be defined to make them contextually significant in the second operating system 220a(2) (e.g., in terms of look and feel) as that is the one displayed on the monitor 320 and with which a user may be interacting.

The configuration as described provides an advantage of having the active (or inactive) information from the first operating system 220a(1) appear on a larger screen/monitor 320, which is displaying the second operating system 220a(2). Hence, a user is provided access to both sessions and both are active within a same display region of a device.

The configurations illustrated and described herein beneficially can expand the realm of executable applications within the mobile computing device 110. For example, applications need not be ported to the first operating system 220a(1) to be executable on the mobile computing device 110. Moreover, certain applications that can only be executable on the second operating system 220a(2) can continue to be executed on the mobile computing device 110. Further, the example configurations allow for both operating systems 220a(1), 220a(2) to be fully operational on the mobile computing device thereby permitting tasks such as answering a call through the first operating system 220a(1) while working on a ABOBE PHOTOSHOP application on the second operating system 220a(2). In addition, when docked, the configuration also can respond to applications running in the first operating system 220a(1) and shown on the monitor 320 to the second operating system 220a(2). For example, a response to an SMS message can be entered through the keyboard 330 and seen on the monitor 320, sent via the second operating system 220a(2) as described and transmitted through the first operating system 220a(1).

Additional Configuration Considerations

The configurations as described provide for numerous use cases of interest. For example, data and files stored in the mobile computing device 110 can be shared between the first operating system 220a(1) and the second operating system 220a(2) so that applications in one can use data and files manipulated (e.g., created, stored, revised, updated or received) by the other. In addition, by way of example, when the mobile computing device is in a docked configuration, data normally accessible within the first operating system 220a(1) is available and retrievable by applications and applets executing in the second operating system 220a(2) or may be accessible as an application through a browser window that displays the interface of the first operating system 220a(1) application, e.g., a contact manager.

Furthermore by example, as noted above a state machine or module may also be present that allows passage of state and contextual information between the two operating systems 220a(1) and 220a(2). Examples of such information may include recently opened or retrieved files or a browser history, bookmarks, and personal information manager (PIM) information such as contact details, calendar events, to-do lists and the like. Moreover, events received or triggered in one operating system, for example, the first operating system 220a(1) can be received by the second operating system 220a(2) and either provided for display in an application or applet having a look and feel corresponding to application executed in the second operating system 220a(2) or can be provided for display within a browser session having a look and feel that may correspond to the first operating system 220a(1).

Some portions of above description describe the embodiments in terms of algorithms and symbolic representations of operations on information, for example, as illustrated and described with respect to FIGS. 4a through 12. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for a dual operating system configuration within a mobile computing device through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method operable in a mobile computing device, the method comprising:
   initializing a virtual machine, the virtual machine configured to manage communications between a first operating system and a second operating system;
   initiating the first operating system, the first operating system communicatively coupled with the virtual machine and configured to manage a state of the mobile computing device and resources operable within the mobile computing device;
   initiating the second operating system, the second operating system communicatively coupled with the virtual machine;
   receiving an indication of an event corresponding to the mobile computing device being communicatively coupled to at least one second device,
   initiating one or more device drivers of the second operating system that are otherwise inoperable in the first operating system in response to receiving the indication, wherein a respective device driver is initiated to communicatively couple with the at least one second device;
   causing a graphic user interface of the second operating system to be displayed on the at least one second device, the graphic user interface including a window for an application that is run on the first operating system; and
   enabling a user to operate the application of the first operating system using the at least one second device via the virtual machine and the respective device driver in the second operating system.

2. The method of claim 1, wherein the mobile computing device comprises a smartphone or a tablet computer.

3. The method of claim 2, wherein the first operating system comprises a mobile computing device operating system.

4. The method of claim 3, wherein the second operating system comprises a desktop operating system.

5. The method of claim 1, wherein the at least one second device includes at least one of a display device, a keyboard, or a mouse.

6. The method of claim 1, wherein the second operating system is initiated concurrently with initiating the first operating system.

7. A method of communicating between a first operating system and a second operating system simultaneously running on a mobile computing device, the method comprising:
   initializing a virtual machine, the virtual machine configured to manage communications between a first operating system and a second operating system;
   initiating the first operating system, the first operating system communicatively coupling the virtual machine and configured to manage a state of the mobile computing device;
   initiating the second operating system, the second operating system communicatively coupling the virtual machine;
   displaying, within the first operating system, a user interface corresponding to an application program executable within the second operating system;
   transmitting from the first operating system to the second operating system via the virtual machine, a command message for executing an instruction for the application program; and
   receiving, at the first operating system from the second operating system via the virtual machine, a response from the execution of the instruction by the application program;
   wherein transmitting the command message comprises:
      determining a state of the second operating system;
      transmitting, in response to the second operating system being in an ON state, the command message to the second operating system through the virtual machine.

8. The method of claim 7, wherein the first operating system is further configured to manage resources operable with the mobile computing device, and data management for the mobile computing device.

9. The method of claim 7, wherein the application program comprises a media playback application.

10. The method of claim 9, further comprising receiving, through the user interface of the media playback application, a selection for playback of a media track.

11. The method of claim 10, wherein the command message corresponds to the selection for playback of the media track.

12. The method of claim 6, wherein the application program comprises a virtual private network (VPN) application.

13. The method of claim 12, further comprising receiving, through the user interface of the VPN application, a selection by a user to initiate execution of the VPN application within the second operating system.

14. The method of claim 12, further comprising automatically generating an instruction by the first operating system to initiate execution of the VPN application within the second operating system in response to the command message.

15. The method of claim 14, further comprising translating, via the virtual machine, the instruction generated by the first operating system into a VPN execution instruction message for the VPN application executed on the second operating system.

16. A mobile computing device comprising:
   a processor;
   a memory coupled to the processor, the memory storing instructions that, when executed by the processor, causes the processor to perform operations comprising:
      initializing a virtual machine, the virtual machine configured to manage communications between a first operating system and a second operating system;
      initiating the first operating system, the first operating system communicatively coupled with the virtual machine and configured to manage a state of the mobile computing device and resources operable within the mobile computing device;
      initiating the second operating system, the second operating system communicatively coupled with the virtual machine;
      receiving an indication of an event corresponding to the mobile computing device being communicatively coupled to at least one second device,
      initiating one or more device drivers of the second operating system that are otherwise inoperable in the first operating system in response to receiving the indication, wherein a respective device driver is initiated to communicatively couple with the at least one second device;
      causing a graphic user interface of the second operating system to be displayed on the at least one second device, the graphic user interface including a window for an application that is run on the first operating system; and
      enabling a user to operate the application of the first operating system using the at least one second device via the virtual machine and the respective device driver in the second operating system.

17. The mobile computing device of claim 16, wherein the mobile computing device comprises a smartphone or a tablet computer.

18. The mobile computing device of claim 16, wherein the first operating system comprises a mobile computing device operating system.

19. The mobile computing device of claim 18, wherein the second operating system comprises a desktop operating system.

20. The mobile computing device of claim 16, wherein the processor initiates the second operating system concurrently with initiating the first operating system.

* * * * *